United States Patent [19]
Kopacki et al.

[11] 4,012,356
[45] Mar. 15, 1977

[54] SUSPENSION-EMULSION INTERPOLYMER CONTAINING TRIS(2-ETHYLHEXYL) PHOSPHATE

[75] Inventors: Adam F. Kopacki, Westwood, N.J.; John H. Deatcher, Lake Peekskill, N.Y.

[73] Assignee: Stauffer Chemical Company, Westport, Conn.

[22] Filed: Mar. 31, 1975

[21] Appl. No.: 563,438

[52] U.S. Cl. .................... 260/30.6 R; 260/30.8 R; 260/31.6; 260/885

[51] Int. Cl.² ................. C08K 5/10; C08K 5/43; C08K 5/51; C08L 32/01

[58] Field of Search ............ 260/30.6 R, 29.7 UP, 260/885

[56] References Cited

UNITED STATES PATENTS

| 3,780,141 | 12/1973 | Jin et al. | 260/30.6 R |
| 3,821,329 | 6/1974 | Gallagher | 260/30.6 R |
| 3,832,318 | 8/1974 | Gallagher et al. | 260/29.7 UP |

Primary Examiner—Allan Lieberman
Attorney, Agent, or Firm—Richard P. Fennelly

[57] ABSTRACT

An interpolymer which contains a crosslinked acrylate component formed by emulsion polymerization and a polyvinyl chloride component formed by suspension polymerization also comprises an effective amount for improved impact resistance of a plasticizer which is compatible with the acrylate component and which is incompatible with the polyvinyl chloride component.

7 Claims, No Drawings

SUSPENSION-EMULSION INTERPOLYMER CONTAINING TRIS(2-ETHYLHEXYL) PHOSPHATE

TECHNICAL DESCRIPTION OF THE INVENTION

Recently, interpolymers have been formed by first emulsion polymerizing an acrylate in the presence of a crosslinking agent to form a crosslinked acrylate latex and thereafter suspension polymerizing a vinyl chloride monomer in the presence of such a latex to form an acrylate/polyvinyl chloride interpolymer which can be used to confer improved impact resistance on a wide variety of rigid plastics. Examples of processes for forming such interpolymers are described in U.S. Pat. No. 3,832,318 to Ruth E. Gallagher et al. and in U.S. Pat. No. 3,929,933 of Ruth E. Gallagher, each of which are incorporated herein by reference.

The basic process for forming such an interpolymer comprises the preparation of a monomer charge comprising an aqueous emulsion containing about 10 to about 50%, by weight, of a quantity of an aromatic or $C_2$–$C_8$ alkyl acrylate, e.g., about 90 to about 99.8% by weight, based on the total monomer content, and a poly-functional ethylenically unsaturated monomer, e.g. about 0.2 to about 10%, by weight based on the total monomer content. Representative acrylates and ethylenically unsaturated monomers are listed in U.S. Pat. No. 3,832,318 to R. E. Gallagher et al. Suitable acrylates include n-butyl acrylate, ethyl acrylate, 2-ethylhexyl acrylate, benzyl acrylate, and mixtures thereof. About 0.5 to about 2.0% by weight of the monomer mixture of a water soluble catalyst or a redox system is also introduced, and the mixture is heated to about 40° to about 95° C. for about 0.5 to about 8 hours. The emulsion also contains about 0.2 to about 2.0% by weight of a conventional emulsifying agent, such as dodecyl benzene sodium sulfonate, sodium lauryl sulfate and the like. The crosslinked acrylate polymer or copolymer that results has a glass transition temperature of about 25° C. or less.

When the crosslinked acrylate latex has been formed, a suspension polymerization of a vinyl chloride monomer charge is carried out in its presence. The vinyl chloride monomer charge comprises vinyl chloride alone or in combination with a suitable comonomer, e.g., vinyl acetate. This monomer charge is added to the aqueous acrylate emulsion in a concentration of about 40 to about 90%, by weight, of the crosslinked acrylate particles. Also required is about 0.05 to about 1.0% of a suitable suspending agent and about 0.02 to about 1% of a monomer soluble catalyst, as described in U.S. Pat. No. 3,832,318 to R. E. Gallagher et al. The polymerization is conducted at about 45° to about 75° C. for about 2 to about 12 hours. The product is an aqueous suspension of interpolymer particles wherein the polyvinyl chloride is intimately dispersed throughout the mass of crosslinked rubber particles. These interpolymers can be used to confer impact upon any of the rigid plastics enumerated in the above mentioned U.S. Pat. No. 3,832,318. The term "rigid plastic" as used herein is intended to be defined as it is defined in ASTM D-883, i.e., as denoting a plastic that has a modulus of elasticity, either in flexure or in tension, of greater than 7,000 kgf./cm² (100,000 psi) at 23° C. and 50% relative humidity when tested in accordance with ASTM D-747, D-790, D-639 or D-882.

When the interpolymers formed by the above described process are incorporated in a rigid plastic they improve the impact resistance of such a plastic. Although the amount to be added will of course vary depending upon the exact composition of the interpolymer and the type of rigid plastic, it is well within the skill of a person in the art to select appropriate interpolymer compositions and appropriate rigid plastics to give a product having a desired impact resistance as measured, for instance, by the Izod impact of the resulting modified rigid plastic.

Although the interpolymer particles in certain weight amounts will give a desired Izod impact, the process for their fabrication is rather expensive and time consuming. Hence, a need exists for a more economical way of obtaining the same desired level of impact resistance by use of lower levels of interpolymer. The present invention is directed to satisfying this need.

The present invention relies upon the use of a plasticizer which is compatible with the acrylate component and which is incompatible with the polyvinyl chloride component as an additive to the interpolymer described above to maintain the impact resistance when lower amounts of such an interpolymer are used in a rigid plastic or, if desired, to confer enhanced impact resistance when added at certain amounts to an interpolymer-rigid plastic blend. Generally speaking, the amount of interpolymer will range between about 5 and about 15%, preferably about 10 to about 15%, by weight based on the weight of the rigid plastic with the amount of plasticizer inversely ranging between about 15 and about 5%, preferably about 15 to about 10%, by weight of the rigid plastic, respectively. Use of higher amounts of the plasticizer than those given above will result in a non-rigid blend having an essentially unmeasurable impact resistance. This is due to the incompatibility between the plasticizer and the rigid plastic, e.g., PVC, resulting in the formation of a pliable plasticized composition having little rigidity. If the appropriate amounts of plasticizer and acrylate/PVC interpolymer are compared to one another it is possible for the plasticizer to comprise between about 20 and about 300%, preferably between about 33 and about 150%, most preferably between about 33 and about 66%, by weight, of the amount of interpolymer. Use of small amounts of interpolymer in the interpolymer-rigid plastic blend will require use of higher levels of plasticizer and vice-versa.

The plasticizer which can be used in the present invention can be selected from a wide variety of acrylate compatible/PVC incompatible plasticizers known to the prior art. A Table illustrating the compatibilities of the most well known plasticizers is given in Modern Plastics Encyclopedia, Vol. 51, No. 10A, pp. 775–785 (1974). Illustrative plasticizers which may be selected for use are tris(2-ethylhexyl) phosphate, the preferred plasticizer, butyl ricinoleate, hydroxyalkyl benzene sulfonamide, polyethylene glycol (600) dibenzoate, methyl ricinoleate, and benzene-sulfonbutyl amide.

The following Examples illustrate the invention:

EXAMPLE 1

An interpolymer is formed by the following procedure:

About 127.7 lb. of deionized water, 17.3 lbs. of butyl acrylate, 161 g of butylene diacrylate, 25 g of the tris (tridecyl) ester of sodium sulfosuccinic acid (Aerosol TR-70) and 33 grams of potassium persulfate were charged into a 30 gallon reactor. To this mixture was then added 15g of sodium bicarbonate and 0.3g of ferric sulfate. The reactor was closed and a vacuum (26in. Hg) was twice applied and twice broken by addition of nitrogen. The stirrer was set at about 180 rpm and the mixture was heated to 35° C. Sodium busulfite (15g) was added at this point and the reactor was allowed to stand for 1 hour at the above temperature. The reaction mixture was heated to 50° C and was allowed to stand at this temperature for about 2 hours. It was then cooled down to 35° C for the vinyl suspension polymerization step.

In the second step 48.3 lbs. of distilled water, 36 g of Methocel 90 HG 15000 and 13 g of lauroyl peroxide were charged to the batch formed in the first step. Vacuum was applied twice, and the resulting reaction environment was purged with a stream of vinyl chloride monomer. About 26 lbs. 11 oz. of vinyl chloride monomer was then added and the solution was heated to 60° C while being agitated at 35 rpm. The reaction was terminated when the pressure decreased by 38 psia. Butylated hydroxytoluene was added, and unreacted vinyl chloride was vented off. The mixture was allowed to cool to 30° C, and the product was recovered.

EXAMPLE 2

A series of polyvinyl chloride containing compositions were made by mixing polyvinyl chloride suspension resin with varying amounts of the interpolymer from Example 1 (labelled "SEI" in the Table below) and tris(2-ethylhexyl) phosphate plasticizer (labelled "TOF" in the Table below). The Izod impact at 23° C. was determined in accordance with ASTM D-256-72a. The amount of the interpolymer and phosphate plasticizer are expressed in parts per hundred based upon the amount of polyvinyl chloride suspension resin. The values in the Table are given in ft lb./in. of notch on the basis of a 1 in. sample.

| TOF (phr): | 0 | 5 | 10 | 15 |
|---|---|---|---|---|
| SEI(phr) | | | | |
| 0 | | 0.5 | 0.5 | 0.5 | * |
| 10 | 2.0 | 4.2 | 3.5 | 21.0 |
| 15 | 6.2 | 23.8 | 21.1 | ** |
| 20 | 25.0 | ** | ** | ** |

*Incompatibility of the TOF in PVC above 10 phr precluded the measurement of the Izod impact point.
**No impact measurements were made once the brittle/ductile transition was made as reflected in the number of Izod impact breaks, i.e., 9 breaks for 9 samples tested vs. 0 or 1 breaks for the 9 samples.

When dioctyl phthalate, a plasticizer which is compatible with polyvinyl chloride, was present at 5 phr and the interpolymer was present at 15 phr, the Izod impact was 2.1 ft. lb./in. rather than the 23.8 value obtained when the same amount of tris(2-ethylhexyl phosphate) was used.

The above Examples illustrate certain preferred embodiments of the present invention and are merely illustrative. The appended claims set forth the scope of protection sought.

What is claimed:

1. In an acrylic rubber-containing suspensionemulsion interpolymer which contains a crosslinked acrylate component having a glass transition temperature of about 25° C. or less formed by emulsion polymerization, said component comprising from about 90 to about 99.8% of an aromatic or $C_2$–$C_8$ alkyl acrylate and from about 0.2 to about 10% by weight of a polyfunctional ethylenically unsaturated monomer and a polyvinyl chloride component formed by suspension polymerization, said polyvinyl chloride component comprising from about 40 to about 90% by weight of the crosslinked acrylate component, wherein the improvement comprises an effective amount of a tris(2-ethylhexyl)phosphate plasticizer.

2. An interpolymer as claimed in claim 1 wherein the amount of plasticizer ranges between about 20 and 300% by weight based on the weight of the interpolymer.

3. An interpolymer as claimed in claim 1 wherein the amount of plasticizer ranges between about 33 and about 150% by weight of the interpolymer.

4. An interpolymer as claimed in claim 1 wherein the amount of plasticizer is about 33 to about 66% by weight based on the amount of interpolymer.

5. A composition containing a rigid plastic and an effective amount for improved impact resistance of the crosslinked acrylate/polyvinyl chloride interpolymer of claim 1 which contains said plasticizer.

6. A composition as claimed in claim 5 wherein the amount of interpolymer of acrylate and polyvinyl chloride contained therein ranges between about 5 and 15% by weight of the rigid plastic and the amount of plasticizer ranges between about 15 and 5% by weight of the rigid plastic, respectively.

7. A composition as claimed in claim 5 wherein the amount of interpolymer of acrylate and polyvinyl chloride is about 10 to about 15% by weight of the rigid plastic and the amount of plasticizer is about 15 to about 10% by weight of the rigid plastic.

* * * * *